May 15, 1951      L. L. GAGNON      2,553,181

OPHTHALMIC MOUNTING

Filed Jan. 2, 1948

INVENTOR

Louis L. Gagnon

Patented May 15, 1951

2,553,181

UNITED STATES PATENT OFFICE 2,553,181

OPHTHALMIC MOUNTING

Louis L. Gagnon, Southbridge, Mass., assignor to American Optical Company, Southbridge, Mass., a voluntary association of Massachusetts Application January 2, 1948, Serial No. 19

3 Claims. (Cl. 88—41)

This invention relates to ophthalmic mountings and particularly to an improved lens supporting structure for such mountings.

The use of non-metallic material for the supporting structure of lenses in ophthalmic mountings is well known in the art. In this invention, the non-metallic parts are preferably formed of material having the characteristics of artificial resins which possess a relatively non-inflammable, acid-resisting nature, and which tend to be less subject to deformation from their original shapes due to changes in atmospheric or other conditions to which they may be subjected. Such materials are also exceedingly light in weight and are readily moldable or otherwise workable, and the parts composed thereof may be made to any desired color or colors.

Nevertheless, it being common knowledge that non-metallic materials of this type are generally semi-pliable or flexible in nature and easily subject to deformation or distortion, it is necessary to provide a suitable method of connecting the lenses of ophthalmic mountings to their supporting structures whereby the lens will receive no strain or only partial strain when the non-metallic parts are subjected to shock or caused to be deformed.

Therefore, it is the principal object of this invention to provide an ophthalmic mounting with a lens supporting structure of non-metallic material wherein the lens is attached to the supporting structure by a resilient connection.

It is another object of this invention to provide an ophthalmic mounting with resilient means for attaching the lens to the supporting structure, the resilient means being of a universal flexing nature thus permitting the non-metallic supporting structure to be slightly distorted in practically any direction by shock or otherwise without transmitting the distortion and strain to the lens.

Another object of the invention is the provision of improved efficient resilient shock absorbing means for connecting the lenses of ophthalmic mountings to their supporting structures.

Another object of the invention is to provide an ophthalmic mounting with a supporting structure the parts of which are entirely out of the useful field of vision of the wearer when the mounting is in position of use on the face and also relatively inconspicuous to an observer.

Further objects are to provide, in a manner as hereinafter set forth, an ophthalmic mounting which is simple in its construction and arrangement, strong, durable, thoroughly efficient in its use, readily assembled, and comparatively economical to manufacture.

Other objects and advantages of the invention will become apparent from the following description taken in connection with the accompanying drawings, in which.

Figure 1:
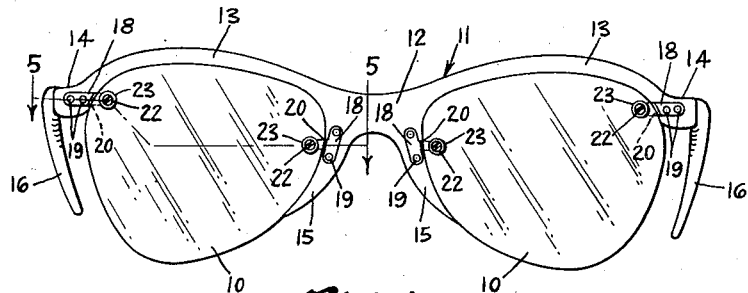
Fig. 1 is a front elevation of an ophthalmic mounting embodying the invention.
Figure 2:
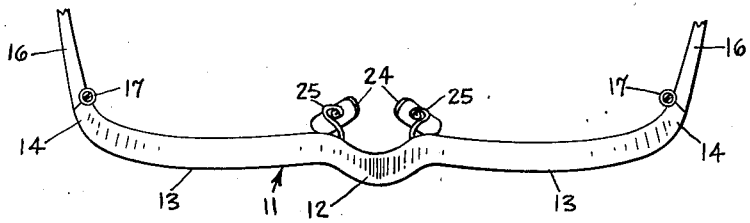
Fig. 2 is a plan view of the mounting illustrated in Fig. 1.
Figure 3:
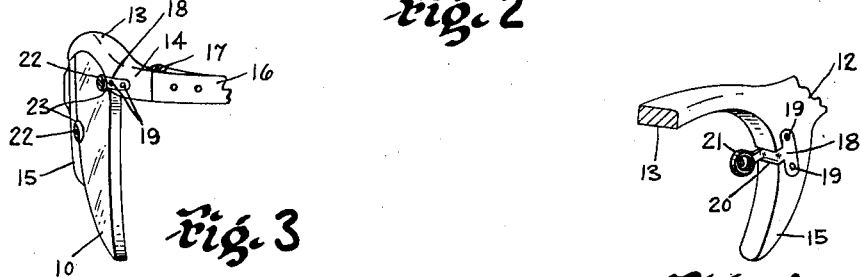
Fig. 3 is a side elevation of the same.
Figure 4:
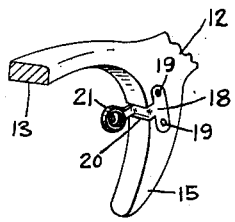
Fig. 4 is a fragmentary view illustrating the temporal lens connecting means.
Figure 5:
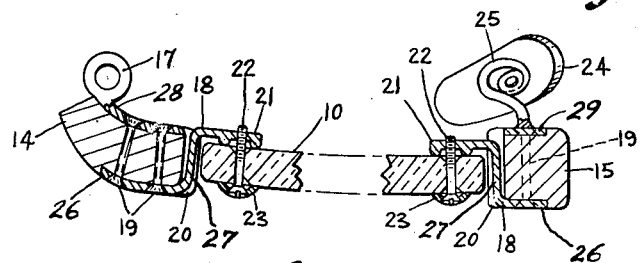
Fig. 5 is a sectional view taken on line 5—5 of Fig. 1 and showing clearly the resilient means for connecting the lenses to the supporting structure.

Referring more particularly to the drawing wherein like characters of reference designate like parts throughout the several views, the device embodying the invention as illustrated in Fig. 1, comprises broadly a pair of lenses 10 carried by a supporting structure or frame 11. The supporting structure 11 comprises a main bridge member 12 having integral transverse lens supporting arms 13 shaped substantially to follow the adjacent upper contour edge portions of the lenses 10 and having temple supporting end portions 14 extending slightly outwardly and rearwardly of the lenses at their temporal regions. The main bridge member 12 also has depending arms 15 shaped substantially to follow the adjacent nasal contour edge portions of the lenses 10.

The temple supporting end portions 14 have suitable temples or sides 16 pivotally attached thereto as at 17, the portions 14 extending outwardly and rearwardly of the temporal ends of the transverse lens supporting arms 13 at a location substantially above the useful field of vision when the mounting is in position of use, with the temples 16 being located adjacent this position.

The complete supporting structure 11 including the bridge member 12, transverse arms 13, depending arms 15 and temples 16, but excluding the temple pivotal connections 17, are preferably formed of non-metallic material such as zylonite, Celluloid, Bakelite or other artificial resinous material. It is to be understood that the said parts may be formed, however, of any material having characteristics as hereinbefore recited.

Since it is understood that known non-metallic materials of the type preferred are generally of a semi-pliable or flexible nature and easily subject to deformation or distortion, it is necessary to provide a suitable method for resiliently connecting the lenses to the non-metallic supporting structure whereby the lenses will have transferred thereto a comparatively small amount of any shock incurred by the structure. Such a resilient connection is provided for attaching each lens to the supporting structure at both the temporal and nasal regions thereof as can be clearly seen in Fig. 1.

The temporal and nasal connections each embody a strap member 18 having a perforated end portion 26 connected by rivets, screws or similar means 19 to the supporting structure 11, the temporal end portion 26 being attached to the front of the temporal end portions 14 and the nasal end portion 24 to the front of the depending arms 15 of the bridge member 12.

The strap members 18 each have a relatively flat elongated resilient intermediate portion 27. The resilient intermediate portions 27 are adapted to lie within notches 20 formed in the inner marginal surface of the supporting structure adjacent the temporal and nasal sides thereof, the notches being sufficiently large to allow clearances on all sides of the intermediate portions. The strap members 18 are formed with portions bent to project inwardly substantially parallel with the inner surfaces of the lenses 10 and terminate in eyelets 21. The eyelets 21 are cup-shaped on their surface adjacent the lenses 10 and are provided with threaded openings adapted to be aligned with holes drilled in the lenses 10 and are receptive to screws 22 or similar attaching means, the screws 22 being inserted through the lenses 10 and threaded into the eyelets 21. Upon tightening the screw 22, the strain will be exerted mainly upon the interior of the cup-shaped portion of the eyelet 21 and the pressure thus distributed evenly about the rim of said portion rather than directly upon the lens adjacent the screw opening. Fitted over the screws 22 are concave washers or spacers 23 adapted to be inserted between the head of the screws 22 and the lenses 10 and also adapted to distribute pressure on the lenses in a manner similar to eyelets 21.

Nose pads 24 form a necessary component part of a mounting of this type and are pivotally attached to guard arms 25 which in turn are fixedly secured to the depending arms 15 of the bridge member 12.

Thus it will be understood that pressure or shock exerted upon the supporting structure 11 will be transferred to the resilient lens connections and at least partially, if not entirely, absorbed by the connections, thereby preventing the shock from being transferred to the lenses 10. This is, of course, accomplished by the flexible strap portions 27 which have sufficient clearance therearound to be allowed to flex or bend in any direction, the members 18 being of small enough dimensions that universal motion is permitted.

The pins or other connecting means 19 extend through the non-metallic material and, on the temporal side, extend through a perforated plate 28 carrying the temple hinge member 17 and, on the nasal side, extend through a perforated plate 29 to which the nose pad supporting arm 25 is attached. The pins 19 are then headed over to secure the parts in assembled relation.

However, it is to be understood that several changes or modifications may be made and that, although the construction herein described as having a bridge member 12 formed to a given size and having transverse and depending arms 13 and 15 formed integral therewith, the invention, as far as the portions which are shaped to follow substantially the upper contour shape of the lenses are concerned, might be used for different types of bridge members, and it is also to be understood that the nose pads 24 instead of being formed as described might be constructed in various manners integral with the bridge member 12. It is also to be understood that, although the description hereinbefore refers to the supporting structure as being made of a non-metallic material, it might be necessary to provide metallic supporting structures for lenses incorporating the herein disclosed resilient connection. In such a structure, it can also be seen that shock or pressure exerted upon a lens would be at least partially absorbed by the resilient connection.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

Having described my invention, I claim:

1. A lens supporting structure for the lenses of an ophthalmic mounting, said structure comprising a bridge having on the opposed sides thereof downwardly extending depending portions to follow the nasal edge of said lenses and relatively long and slender outwardly extending portions to overlie the top edge of said lenses and terminating in temporal end portions, said temporal end portions each having a perforated hinge plate on the rear side thereof to which a temple may be secured and the depending portions each having a perforated plate on the rear side thereof to which is secured a nosepad supporting arm, and temporal and nasal lens straps each having an ear portion to overlie and be secured with the rear surface of a lens, said lens straps having a forwardly extending intermediate portion of resilient nature angled from said ear portion to extend transversely of the adjacent edge of the lens and terminating in an angled plate-like connection end portion, the plate-like connection end portion of the temporal lens straps being disposed on the front side of the temporal end portions of the plate-like connection end portions of the nasal lens straps being disposed on the front side of the depending portions, said plate-like connection end portions of the lens straps having perforations therein aligned with the perforations in the plates on the rear side of said respective portions of the supporting structure; and pin-like connection means extending through said aligned perforations and the intermediate material of said portions of the supporting structure for securing said plates and lens straps in fixed relation therewith, said intermediate portion of the lens straps being free to flex to permit substantially universal movement of the lenses independently of the supporting structure when assembled therewith.

2. A lens supporting structure for the lenses of an ophthalmic mounting, said structure comprising a bridge having on the opposed sides thereof downwardly extending depending portions to follow the nasal edge of said lenses and relatively long and slender outwardly extending portions to overlie the top edge of said lenses and terminating in temporal end portions, said temporal end portions and depending portions each having aligned plate-like portions disposed on the front and rear sides thereof, and pin-like connection means extending through the intermediate material of the respective portions of the supporting structure and attached to said plate-like portions for securing them in fixed relation therewith, one of said plate-like portions on each of said portions of the supporting structure constituting an integral part of a lens strap, said lens straps having an intermediate portion of resilient nature angled from said plate-like portion to extend transversely of the adjacent edge of the lens and terminating in an angled ear for connection with said lens on the side surface thereof opposed to the side of the portion of the supporting structure on which the plate-like portion of which it is an integral part is disposed, and said temporal end portions and depending portions each having a recess in the lens-edge-directed side thereof extending between said plate-like portions in which the intermediate portion of said lens straps are free to flex to permit substantially universal movement of the lenses independently of the supporting structure when assembled therewith.

3. An ophthalmic mounting comprising a pair of lenses and a supporting structure therefor, said structure embodying a bridge disposed intermediate the lenses and having on the opposed sides thereof downwardly extending depending portions to follow the nasal edge of said lenses and relatively long and slender outwardly extending portions to overlie the top edge of said lenses and terminating in temporal end portions, said temporal end portions each having a perforated hinge plate on the rear side thereof for pivotal connection with a temple and the depending portions each having a perforated plate on the rear side thereof to which is secured a nosepad supporting arm, and temporal and nasal lens straps each having an ear portion to overlie and be secured with the rear surface of a respective lens, said lens straps each having a forwardly extending intermediate portion of resilient nature angled from said ear portion to extend transversely of the adjacent edge of the lens and terminating in an angled plate-like connection end portion, the plate-like connection end portion of the temporal lens straps being disposed on the front side of the temporal end portions and the plate-like connection end portions of the nasal lens straps being disposed on the front side of the depending portions, said plate-like connection end portions having perforations therein aligned with the perforations in the plates on the rear side of said respective portions of the supporting structure, and pin-like connection means extending through said aligned perforations and the intermediate material of said portions of the supporting structure for securing said plates and lens straps in fixed relation therewith, said temporal end portions and depending portions having a recess on the lens-edge-directed side thereof and extending between said plates and plate-like connection end portions of the lens straps in which the intermediate portion of the respective lens straps are free to flex to permit substantially universal movement of the lenses independently of the supporting structure.

LOUIS L. GAGNON.

REFERENCES CITED

The following references are of record in the file of this patent:

UNITED STATES PATENTS

| Number | Name | Date |
|---|---|---|
| 1,971,128 | Braucht et al. | Aug. 21, 1934 |
| 2,034,326 | Brown | Mar. 17, 1936 |
| 2,061,847 | Pappert | Nov. 24, 1936 |
| 2,355,053 | Carlson | Aug. 8, 1944 |
| 2,357,267 | Rohrbach | Aug. 29, 1944 |
| 2,372,059 | Cook | Mar. 20, 1945 |
| 2,436,606 | Rohrbach | Feb. 24, 1948 |
| 2,463,956 | Ellestad | Mar. 8, 1949 |
| 2,474,119 | Rohrbach | June 21, 1949 |